United States Patent [19]
Moriue et al.

[11] Patent Number: 5,142,526
[45] Date of Patent: Aug. 25, 1992

[54] TRANSMISSION FAILURE DIAGNOSIS APPARATUS

[75] Inventors: Hiroo Moriue, Hiratsuka; Yusaku Himono, Tokyo; Osamu Michihira; Toshimichi Tokunaga, both of Hiroshima, all of Japan

[73] Assignees: Furukawa Electric Co., Ltd.; Mazda Corp., both of Tokyo, Japan

[21] Appl. No.: 480,715

[22] Filed: Feb. 15, 1990

[30] Foreign Application Priority Data

Feb. 15, 1989 [JP] Japan ................... 1-33790

[51] Int. Cl.$^5$ .......................... H04J 3/14; H04B 17/00
[52] U.S. Cl. ........................ 370/14; 370/13; 375/10; 371/15.1
[58] Field of Search ............... 370/13, 14, 17, 94.1, 370/15, 85.1, 85.9, 24, 27, 29; 371/64, 15.1, 20.1, 29.1; 455/69; 375/10

[56] References Cited

U.S. PATENT DOCUMENTS

| | | | |
|---|---|---|---|
| 3,593,275 | 7/1971 | Pumpe et al. | 371/64 |
| 4,213,015 | 7/1980 | Kimbrough | 370/14 |
| 4,387,461 | 6/1983 | Evans | 371/64 |
| 4,512,033 | 4/1985 | Schrock | 455/2 |
| 4,951,281 | 8/1990 | Muto et al. | 370/94.1 |

FOREIGN PATENT DOCUMENTS 3233414 3/1984 Fed. Rep. of Germany .
61-32173 7/1986 Japan .

OTHER PUBLICATIONS

Patent Abstracts of Japan, unexamined applications, vol. 7, No. 104, May 6, 1983, p. 113.

Primary Examiner—Stephen Chin
Assistant Examiner—Alpus H. Hsu
Attorney, Agent, or Firm—Staas & Halsey

[57] ABSTRACT

A transmission failure diagnosis apparatus for use in a multiplex transmission system which sends and receives data by time division communication among a plurality of nodes connected by a common transmission path. This transmission failure diagnosis apparatus comprises a reception circuit, connected in the transmission path, for receiving a transmission signal on the transmission path, an amplitude detection circuit for detecting the signal amplitude of a transmission signal received by this reception circuit, and a judgment circuit for judging failures in the system on the basis of the amplitude of the transmission signal detected by the amplitude detection circuit.

12 Claims, 6 Drawing Sheets

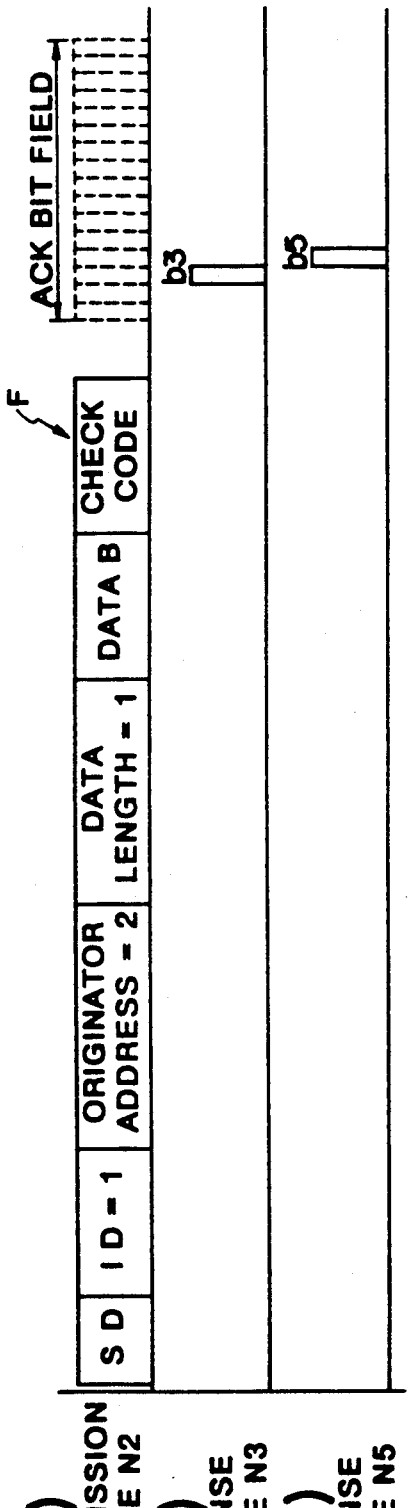
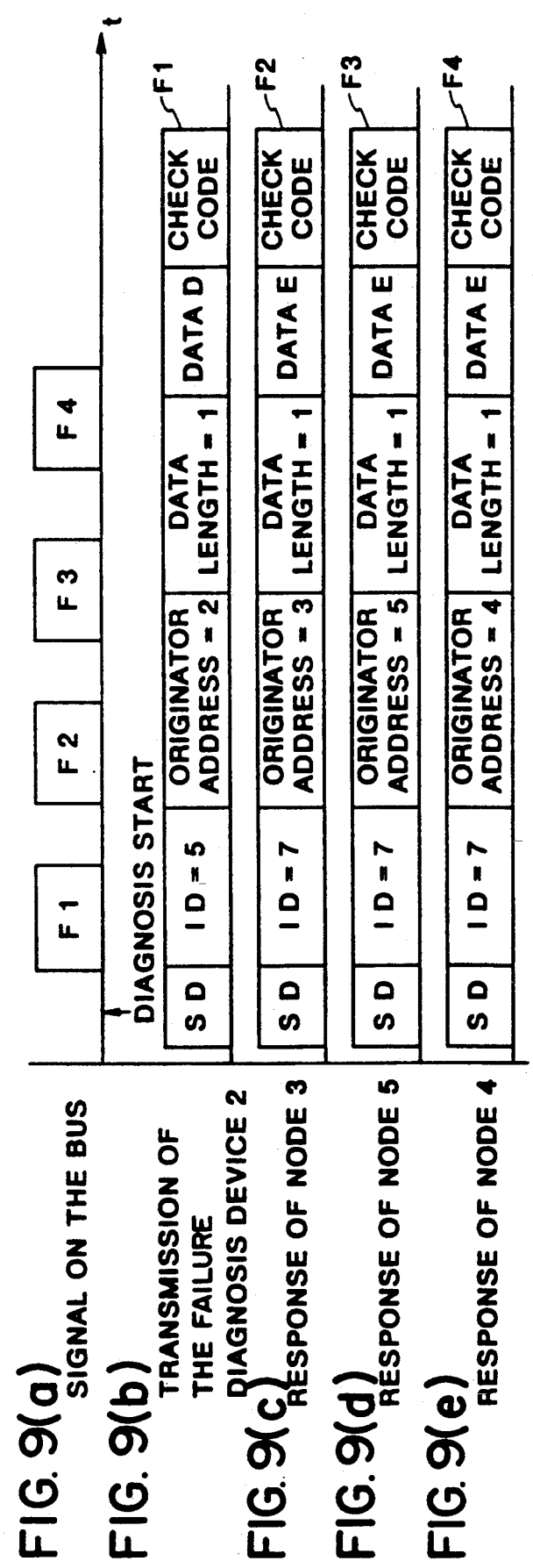

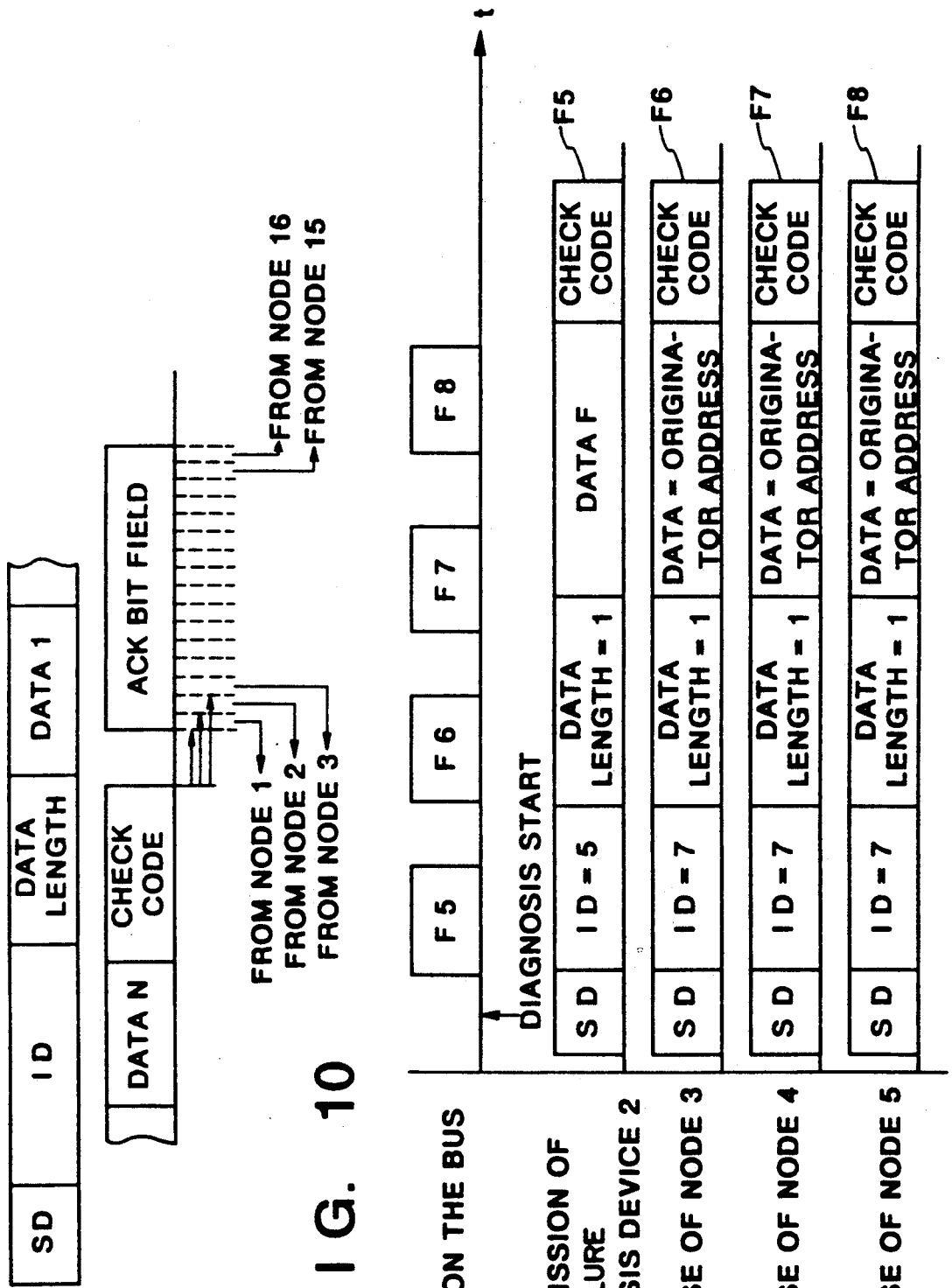

TRANSMISSION FAILURE DIAGNOSIS APPARATUS

BACKGROUND OF THE INVENTION

This invention relates to a transmission failure diagnosis apparatus in a multiplex transmission system which diagnoses failures occurring in a system, for example, line disconnection of a transmission path or failures of transmission functions of nodes and so forth, in a multiplex transmission system which sends and receives data mutually by a time division multiplex communication via a common transmission path among a plurality of nodes. This multiplex transmission system has numerous applications, for example, in a large-scale communication system, LAN in an intelligent building, a bus system in the home, etc.

In recent years, particularly in the field of automobiles, a multiplex transmission system which sends and receives a signal between nodes positioned at various points of a vehicle by using a common multiplex transmission path has been introduced for the purpose of preventing the number of signal lines needed for electronic control from becoming large. Such a multiplex transmission system is disclosed, for example, in Japanese Patent Publication for Opposition (Kokoku) No. 61-32173.

In this kind of multiplex transmission system for vehicles, high reliability for the system is required. For example, to improve reliability (e.g., resistance to noise) against failures in a multiplex transmission path, a twisted pair line made of a pair of signal lines is used as multiplex transmission path, and transmission reception circuits at respective nodes are of a differential input-/output type. Therefore, even if one of the signal lines of the twisted pair line is disconnected, signal transmission can be effected.

In the above-mentioned multiplex transmission system in which a multiplex transmission path is made highly reliable by the use of twisted pair lines, even if one of the signal lines of a twisted pair line is disconnected, the transmission and reception of a signal can be normally effected by using the other signal line. If a failure occurs in the transmission driver circuit of a node, similar phenomena will occur.

Such failures cause transmission data errors and result in an increase in the number of retransmissions. One of the great problems due to such failures is that they result in "data garble," or an increase in the number of retransmissions, so the user does not notice these failures in the multiplex transmission path.

As a result of this, in spite of the fact that high reliability of a multiplex transmission path is achieved by twisted pair lines, the multiplex transmission system remains usable through the agency of a multiplex transmission path which has become low in reliability, after a failure occurs in one of the signal lines of a twisted pair line without being noticed. This fact is a great problem in a system which requires high reliability.

SUMMARY OF THE INVENTION

Accordingly, it is an object of the present invention to provide a transmission failure diagnosis apparatus capable of diagnosing a failure with accuracy when the failure has occurred in a multiplex transmission path or a transmission section of a transmission node in a multiplex transmission system.

A transmission failure diagnosis apparatus of the present invention is one for use in a multiplex transmission system which sends and receives data by time division multiplex communication among a plurality of nodes connected by a common transmission path, comprising reception means, connected to the above-mentioned transmission path, for receiving a transmission signal on this transmission path; amplitude detection means for detecting the signal amplitude of the transmission signal detected by the reception means; and judgment means for judging a failure in the system on the basis of the amplitude of the transmission signal detected by the amplitude detection means.

According to a transmission failure diagnosis apparatus thus constructed, even if, for example, a failure in a transmission function of a transmission origination node or a failure in a common transmission path between the transmission failure diagnosis apparatus and the transmission origination node occurs, a variation in the amplitude of a transmission signal which is received by the transmission failure diagnosis apparatus is detected by the amplitude detection means, and the contents of the failure are judged by the judgment means on the basis of its amplitude value.

According to an aspect of the present invention, the transmission signal includes an identifier for specifying a transmission origination node. In the embodiment to be described later, this identifier is, for example, an ACKNOWLEDGE bit, or a network address indicating a transmission origination.

According to another aspect of the present invention, a transmission path is made up of a pair of signal lines. Transmission signals are represented by first and second differential signals between this pair of signal lines. The transmission of a transmission signal in a differential form leads to high reliability in transmission.

According to a further aspect of the present invention, the judgment means includes a means for comparing the amplitude of a transmission signal detected by the amplitude detection means with that of a transmission signal at normal times. On account of this, detection of an abnormality in a transmission path is simplified.

Yet another aspect of the present invention is characterized by the following configuration. That is, the above-mentioned reception means includes a first reception circuit for receiving a first and a second differential signal separate from each other and for outputting this received signal to the above-mentioned amplitude detection means and a second reception circuit for receiving the first and second differential signals in a differential input format and for outputting this received signal to the above-mentioned judgment means. The above-mentioned judgment means includes the above-mentioned identifier in signal data which is received by the reception means and a means for specifying a faulty node on the basis of the amplitude of a received transmission signal from the above-mentioned amplitude detection means.

With such configuration, the continuation of a multiplex transmission and the detection of a faulty node can be achieved at the same time. That is, for example, in a transmission path such as a twisted pair line, even if a failure exists in one of the line paths, multiplex transmission is possible as mentioned above. According to the present invention, the continuation of multiplex transmission is ensured by the data received by the second reception circuit, and on the basis of a signal received by the first reception circuit, failures can be detected by the judgment means.

According to yet another aspect of the present invention, the protocol of this multiplex transmission system is as described below. That is, in one of the frames of a transmission signal sent and received among nodes is defined an ACKNOWLEDGE bit field with the number of bits corresponding to the total number of nodes, and the address of the bits in this bit field is assigned to each node. It is decided that when a transmission signal received by each node is normal, it sends out an ACKNOWLEDGE bit to a bit position assigned to it. The above-mentioned judgment means of a diagnosis apparatus specifies a faulty node on the basis of the amplitude of a transmission signal corresponding to each ACKNOWLEDGE bit in the ACKNOWLEDGE bit field.

In other words, an ACKNOWLEDGE bit is used to notify a transmission origination of the fact that reception data is normally received by the reception node. This ACKNOWLEDGE bit is also used to detect a transmission path failure.

According to a further aspect of the present invention, the above-mentioned reception means includes a circuit for receiving the above-mentioned first and second differential signals separate from each other and for outputting this received signal to the above-mentioned amplitude detection means. The above-mentioned amplitude detection circuit includes a circuit for sampling a peak value of an output signal from the above-mentioned circuit and a circuit for converting this peak value to a digital value and outputting it to the above-mentioned judgment means.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and reference is made to the claims which follow the description for determining the scope of the invention.

BRIEF DESCRIPTION OF THE DRAWINGS

FIGS. 8(a)–(c) are views for explaining a timing at which nodes $N_3$ and $N_5$, which have received a frame, send back an ACKNOWLEDGE bit in response to a frame sent out from a transmission mode node $N_2$;

FIGS. 9(a)–(e) are views for explaining a situation in which the other nodes send back a response frame in response to a diagnosis start instruction sent out by a node having a transmission failure diagnosis apparatus of the present invention;

FIG. 10 is a view for explaining the format of a frame which is applied to the modifications of the embodiment shown in FIGS. 8 and 9; and FIGS. 11(a)–(e) are views for explaining a situation in which the other nodes send back a response frame in response to a diagnosis start instruction sent out by a node having a transmission failure diagnosis apparatus in a modification in which the format shown in FIG. 10 is used.

DETAILED DESCRIPTION OF THE PREFERRED EMBODIMENTS

The embodiment of the present invention will be described hereinunder with reference to the accompanying drawings.

System Configuration

Figure 1:
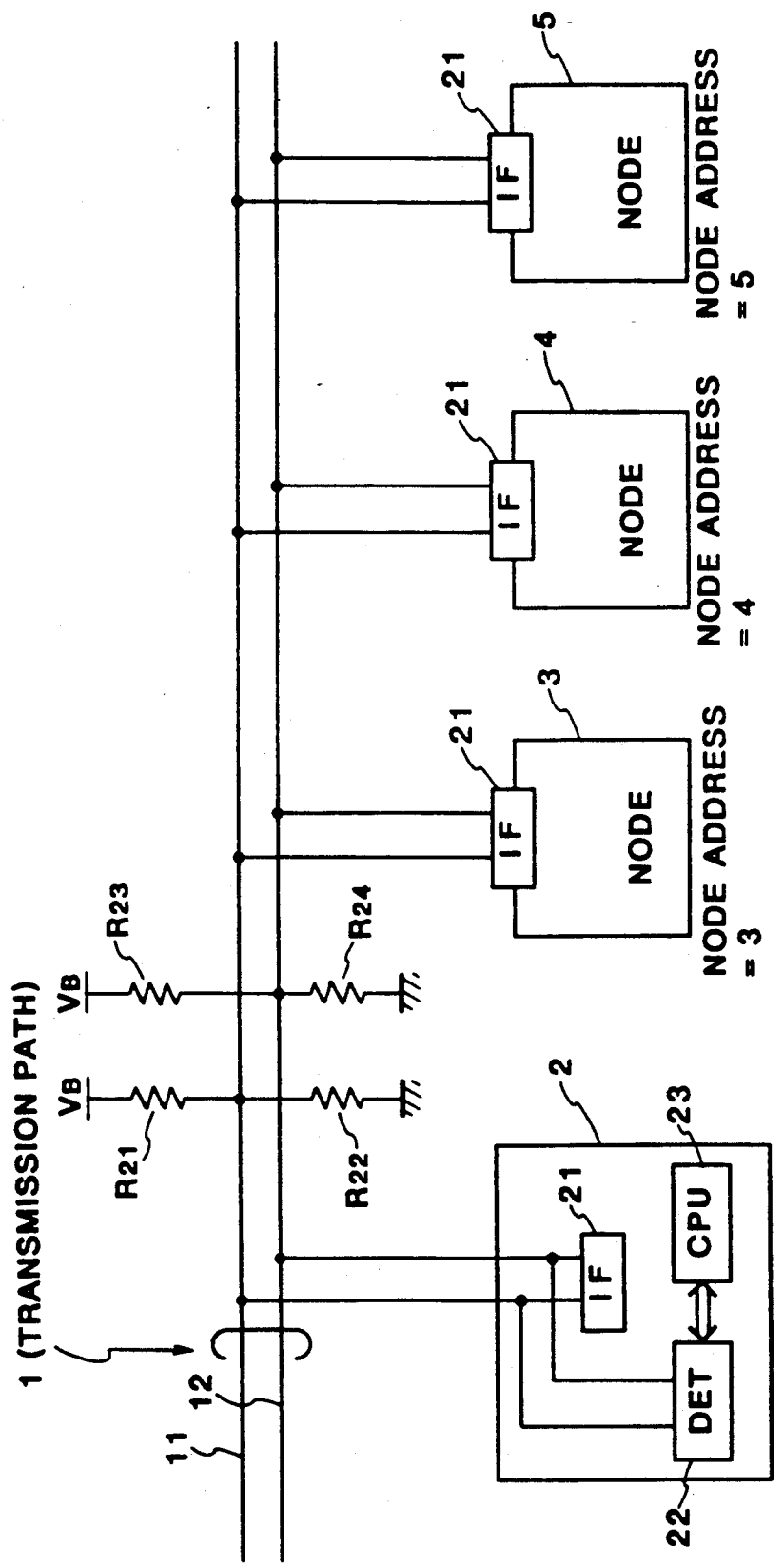
FIG. 1 is a block diagram of a transmission failure diagnosis apparatus of a multiplex transmission system in an embodiment of the present invention.

A transmission failure diagnosis apparatus of a multiplex transmission system in an embodiment of the present invention is shown in FIG. 1. This embodiment is one in which the present invention is applied to a transmission failure diagnosis apparatus for a multiplex transmission system for vehicles. The multiplex transmission system of this embodiment is a bus-coupled LAN of a distribution type for automobiles, adopts an asynchronous time division multiplex contention system which assigns an access right to a transmission path only when messages to be sent to a node exist, and adopts a CSMA/CD method as an access control method (multiplex method).

In FIG. 1 there is shown a balanced-type transmission (bus) path 1 made up of two signal (bus) lines 11, 12. The signal lines 11 and 12 are biased to a predetermined voltage level by bias resistance circuits $R_{21}$ and $R_{22}$, and $R_{23}$ and $R_{24}$ respectively. Also shown in FIG. 1 are communication nodes 2 through 5. These communication nodes are connected to predetermined electrical equipment (not shown) which are unique to respective nodes. These electrical equipment are, for example, digital type meters/indicators, numerous kinds of switches around a steering handle (not shown), operation switches of an air conditioner, etc. It is well known that the simplification of a wire harness can be achieved by connecting such electrical equipments through the use of a pair of signal lines, while in the conventional line connections of such electrical equipments, such an individual electrical equipment is required to be wired.

As shown in FIG. 1, nodes 2, 3, 4 and 5 each are arranged so as to access the transmission path 1 via a bus interface section (IF) 21. The communication node 2 has a function to diagnose failures in this multiplex transmission system, namely, failures at the other nodes 3 to 5, line disconnection or faulty contact of the bus 1, etc. To realize this failure diagnosis function, only the node 2 has a signal amplitude detection circuit (DET) 22, unlike the other nodes 3 through 5.

The configurations of respective nodes except for the node 2 are similar. The node 2 further comprises the DET 22 and a dedicated control program (stored in a CPU 23 to be described later) for controlling the DET 22. That is, each node includes the bus interface (IF), a communication LSI (COM) 24, and the CPU 23 which supervise the control of the IF21, the DET 22 and the COM 24. Communication nodes 2 through 5 are assigned with node address "2", "3", "4" and "5" respectively.

Figure 2:
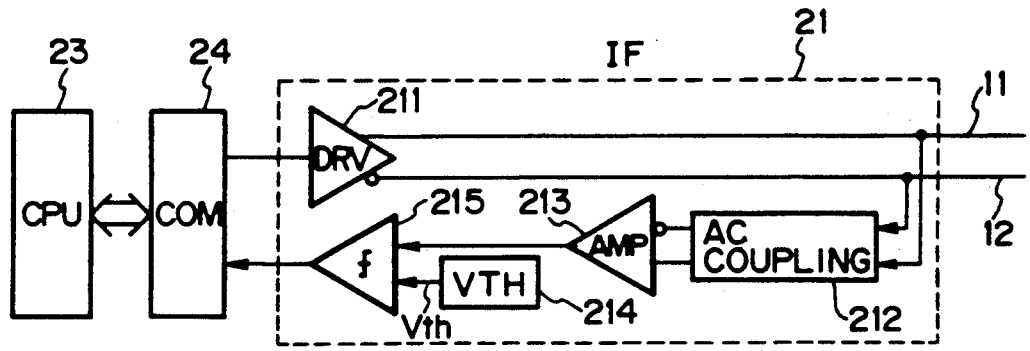
FIG. 2 is a block diagram illustrating an example of the configuration of a bus interface section (IF) 21 of the apparatus in the embodiment of FIG. 1.
Figure 3:
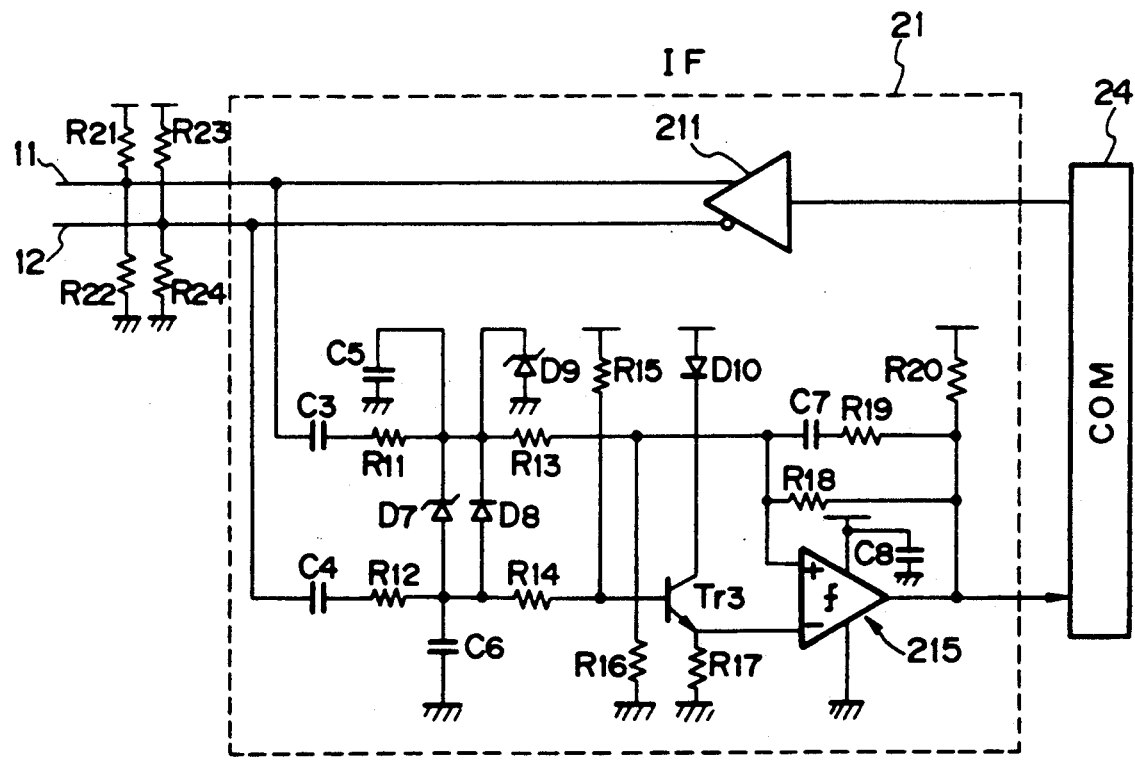
FIG. 3 is a diagram illustrating an example of a more detailed configuration of the reception section of the bus interface section (IF)

The detailed configuration of the interface IF 21 is as shown in FIGS. 2 and 3. Its main roles are to convert transmission data sent from the communication LSI 24 to differential signals and send them out to the bus 1, and to convert the differential signal from the bus 1 to a digital value and output it to the COM 24. The fact will become clear later in connection with the description of FIG. 3 that even if one of the signal lines 11, 12 is disconnected, multiplex communication can be effected by sampling a differential signal in the reception mode in the interface IF 21.

The function of the communication LSI (COM) 24 is to perform bus control under a CSMA/CD method. For example, it includes detection of a carrier on the bus 1, detection of a collision, detection of data error, or creation of an error detection code.

The configuration and function of the amplitude detection circuit (DET) 22, which is indispensable to realize one of the primary functions of the present invention, for detecting the amplitude of a transmission signal on the bus 1 will be explained with reference to FIG. 4.

BUS INTERFACE IF

FIG. 2 shows an example of the configuration of the bus interface section (IF) 21. As shown in this figure, the IF 21 is broadly classified into a transmission circuit and a reception circuit. The transmission circuit comprises a differential drive (DRV) 211 for sending out a transmission signal onto the buses 11 and 12 of the transmission path 1. This differential driver 211 performs transmission so that the polarities of signals being transmitted on the buses 11, 12 are reversed to each other.

That is, the differential drive circuit 211 transmits, on the bus 11, a PWM digital signal of a positive polarity with a certain bias voltage level $V_{11}$ determined as a reference by the bias resistance circuits $R_{21}$ and $R_{22}$. On the other hand, in the bus 12, a negative polarity signal, which is the reverse of the above-mentioned PWM digital signal, is transmitted with a constant bias voltage level $V_{12}$ determined by the bias resistance circuits $R_{23}$ and $R_{24}$.

The reception circuit of the IF 21 includes an AC coupling section (AC) 212 for cutting out the DC bias of a reception signal from the transmission path 1, a differential amplifier (AMP) 213 for amplifying the output of the AC coupling section 212, a threshold value voltage generation circuit (VTH) 214 for generating a predetermined threshold value voltage $V_{th}$, and a comparator (CMP) 215 for comparing the output signal of the differential amplifier 213 with the threshold value $V_{th}$ and outputting its output signal to the COM 24.

The function of this comparator 215 is as will be described below. In a case where the signal amplitude of a received signal via the AC 212 and differential AMP 213 becomes small due to a faulty contact, for example, as described later, if its signal amplitude is greater than the predetermined value $V_{th}$, the comparator 215 reconverts this signal amplitude to a digital signal of a certain voltage level and sends it to the communication LSI (COM) 24. As a result of this, the COM 24 can read in a received signal without fail. In other words, even if one of the communication lines 11, 12 is disconnected, the multiplex communication function of this transmission system is not stopped due to this interface circuit 21. On the other hand, reliability of the transmission is degraded, though the multiplex communication function is not stopped. In order to detect this degradation, the amplitude detection circuit (DET) 22 detects the amplitude of a transmission signal.

FIG. 3 shows an example of the configuration of the IF 21 with a reception circuit thereof focussed. As shown in this figure, this reception circuit is a bus interface circuit of a balanced type transmission system in which the AC coupling circuit 212 with capacitors $C_3$ and $C_4$ are used. As mentioned above, at an abnormal state, a bus signal fails to arrive through one of the buses 11 and 12, and it is configured so that data reception can be effected only by the other bus signal.

In FIG. 3, a resistor $R_{11}$ and a capacitor $C_5$, and a resistor $R_{12}$ and a capacitor $C_6$, each constitute a filter for cutting out the high-frequency components of a bus signal. That is, the resistor $R_{11}$ and the capacitor $C_5$, and the resistor $R_{12}$ and the capacitor $C_6$, correspond to the AC 212 of FIG. 2. A transisotr $Tr_3$, a diode $D_{10}$, etc. correspond to the threshold value generation circuit VTH 214.

The diode $D_8$ of FIG. 8 functions to prevent variations in the DC components due to the duty ratio of a bus signal pulse as well as functions to set a differential reception sensitivity of the reception circuit by its forward voltage $V_{DP}$. A diode $D_9$ absorbs positive and negative surges of a bus signal and protects the input terminal of the comparator 215. The resistors $R_{13}$, $R_{14}$, $R_{15}$, $R_{16}$ and $R_{18}$ set the differential reception sensitivity of the comparator 215 and set its hysteresis.

The base and the emitter voltages of the transistor $Tr_3$ are shifted as much as the base-emitter voltage $V_{BE}$ to each other at all times. Since the transistor $Tr_3$ comprises an emitter follower connection, the input impedance at the base side of the transistor $Tr_3$ becomes high, and therefore its signal transmission speed is sufficiently high. For this reason, if the transistor $Tr_3$ is inserted into one of the transmission lines 11 and 12 of the balanced type transmission path the time balanceness of a received signal and the impedance balance of the bus interface reception circuit (IF) 21 are not lost.

The emitter follower circuit of the transistor $Tr_3$ serves to prevent the reverse input terminal (−) of the comparator 215 from overflowing to the negative side. That is, even if a negative voltage smaller than the base-emitter voltage $V_{11}$ at the time the collector is open is input to the base of the transistor $Tr_3$, the transistor $Tr_3$ is brought into the off state and the reverse input terminal of the comparator 215 does not fall below the voltage of the ground by the insertion of the transistor $Tr_3$ connected with the emitter follower into the reception circuit of the bus interface.

The diode $D_{10}$ serves to prevent a positive surge voltage input from the base of the transistor $Tr_3$ from slipping to the collector and riding on a power supply.

AMPLITUDE DETECTION CIRCUIT (DET)

Figure 4:
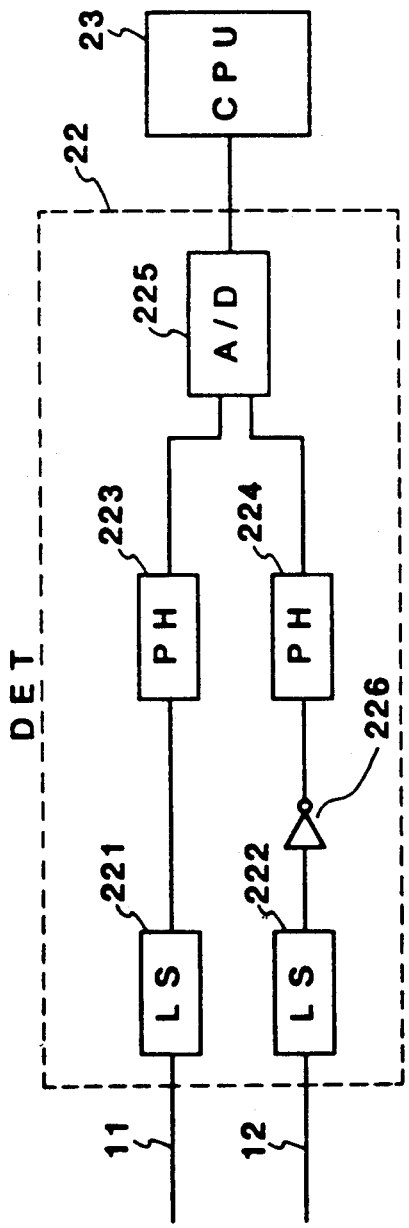
FIG. 4 is a block diagram illustrating an example of the configuration of a signal amplitude detection circuit (DET) of the apparatus in the embodiment of FIG. 1.

FIG. 4 shows an example of the configuration of the amplitude detection circuit (DET) 22. As shown in this figure, this DET comprises level shift circuits (LS) 221 and 222 for shifting the bias voltage levels of the signal lines 11 and 12 to a predetermined reference level, peak hold circuits (PH) 223 and 224 for holding the peak values of the output signals of the LS's 221 and 222 respectively, an A/D converter 225 for A/D converting respective output signals of the PH's 223 and 224 to the CPU 23, and an inverter 226 for inverting the polarity of a received signal at the bus 12 side. The peak value of the amplitude of a transmission signal on respective signal lines 11 and 12 is detected, A/D converted into a digital value, and input to the CPU 23.

Figure 5:
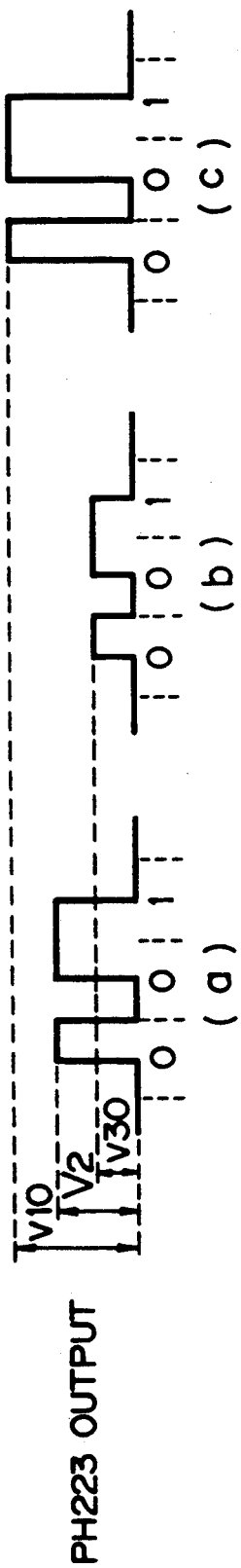
FIGS. 5 and 6 are views illustrating signal waveforms on two signal line paths.
Figure 6:
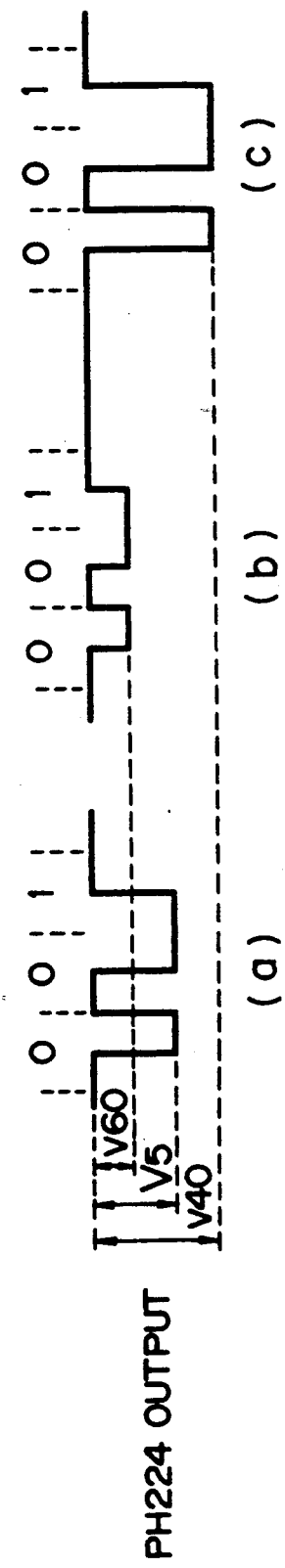

FIG. 5 shows an example of a signal waveform on the bus 11. FIG. 6 shows an example of a signal waveform on the bus 12. In each figure, (a) indicates a signal waveform at normal time; and (b) and (c) indicate signal waveforms when the bus interface (IF) section of a transmission origination node is abnormal. Let the voltages of the signal lines 11 and 12 input by the CPU 23 from the AD conversion section 225 (output from PH) denote $V_2$ and $V_5$ respectively.

If $V_{10} > V_2 > V_{30}$ and $V_{40} > V_5 > V_{60}$, then, this can be judged to be normal. Conversely, if $V_2 > V_{10}$, $V_2 < V_{30}$, $V_5 > V_{40}$, or $V_5 < V_{60}$, then this indicates that an input signal is either abnormally high or low, so this is judged to be abnormal. This judgment is made by the CPU 23.

As described above, since the signal amplitudes on respective buses 11 and 12 differ between during a normal time and an abnormal time, an occurrence of a failure of the transmission function of the transmission origination node can be detected immediately by judging this signal amplitude with a predetermined threshold value ($V_{10}$, $V_{30}$, $V_{40}$, $V_{60}$, etc.). When a line disconnection occurs in the buses 11 and 12, or a short-circuit failure occurs in the ground or the power supply and, since sending and receiving of a signal cannot be performed via the bus in failure, these failures can be detected immediately.

DETERMINATION OF FAULTY NODE

In this embodiment, the detection of the node a failure of which exists in a transmission signal is performed as described below. An identifier for identifying a transmission originator is provided on data sent and received within the transmission system. As explained with reference to FIG. 3, even if a failure occurs in one of the signal lines, the IF circuit 21 can receive data correctly, and the communication LSI 24 and the CPU 23 can analyze the data. That is, a frame received by the node 2 at which a transmission failure diagnosis apparatus is provided, can be specified from what node it is transmitted. As explained with reference to FIG. 4, the amplitude detection circuit (DET) 22 detects an abnormality of the amplitude of a transmission signal in real time and can notify the CPU 23 of this fact. Therefore, the CPU 23 can specify the node, which is a transmission originator, which sent data in which an amplitude abnormality has been detected.

In this embodiment, an ACKNOWLEDGE bit field and an address field are provided as the above-mentioned identifier. A frame format of transmission data, including these fields, will be explained below.

Figure 7:
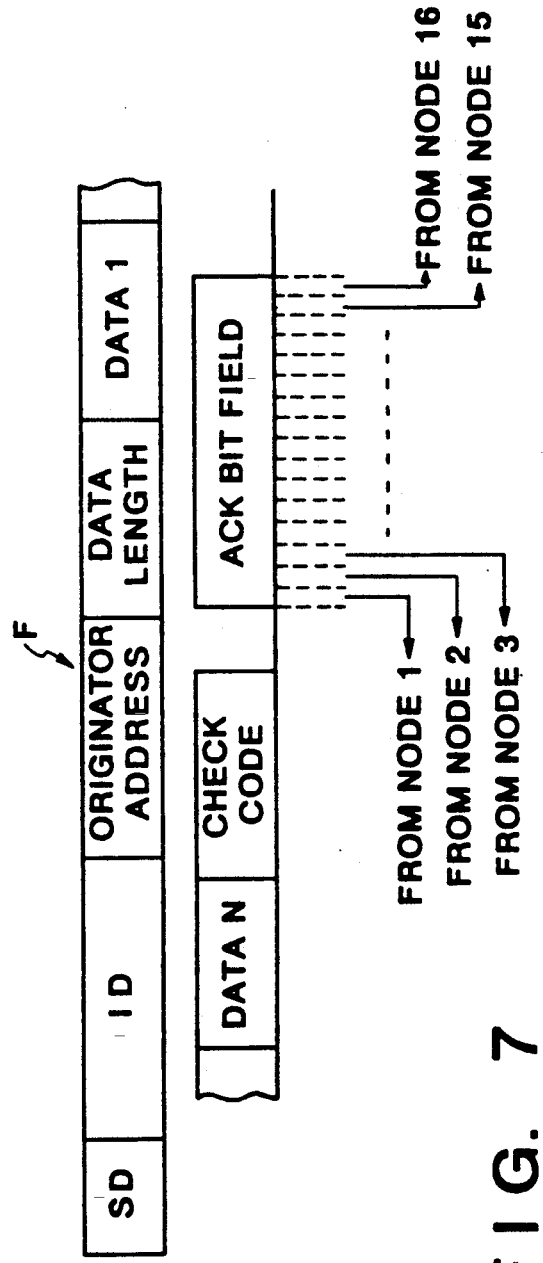
FIG. 7 is a view for explaining the format of one frame which is sent and received in a transmission system of the present invention.

FIG. 7 is a schematic diagram of the format structure of a transmission frame F sent and received on a network of this multiplex transmission system. This frame F comprises an SD (start delimiter) code field, an ID (identification) code field, an originator address field, a data length field, a data field (data 1 to N), an error check code field, and an ACK bit field.

The SD code is a specific symbol for illustrating the start of the frame F. The ID code field is used to specify an address (i.e., function address) assigned from a viewpoint of functions. This function address is equivalent to the functional addressing in a reference literature "A Proposal for a Vehicle Network Protocol Standard" published in SAE International Congress and Exposition in February, 1986.

TABLE

| Function Address | Physical Address | | |
|---|---|---|---|
| | 3 | 4 | 5 |
| 1 | O | | |
| 2 | | O | |
| 3 | | | O |
| 4 | O | | O |
| 5 | O | O | O |
| 6 | | O | O |

It is known from this table, for example, that if "b4" is sent out from the node 2 as a function address, its frame data is to be sent to nodes 3 and 5, and when the function address is "6", its frame data is to be sent to nodes 4 and 5.

Respective nodes 3 through 5 have a correspondence table with the function address and the physical address for transmission, like the above-mentioned table, to check to which physical node it should be sent. Similarly, respective nodes have a function address table for reception to know that a frame with which function address should be received.

The address of a node which transmits a frame F is written in the originator address field, on account of which the node which has received the frame knows from which node the frame has been transmitted.

In the data length field is written the number of data which follow this field. In this case, if it is assumed that N number of data exist, "N" is sent as its data length. The node which has received this frame F reads in an amount of data equal to the data length. That is, the end of frames can be known by the content of the data field.

A reception-side node recognizes a check code (error detection code) which follows the data, and checks to see if any error exists in the content of the received frames. If there is no error, it sends out a reception confirmation bit to the transmission path.

An ACKNOWLEDGE bit field (reception confirmation signal) has a bit length corresponding to the number of nodes of the entire system. Each bit position is assigned to a respective node. That is, this ACKNOWLEDGE bit field is divided into a plurality of time slots (1 bit each), as shown in FIG. 7, and a time slot is assigned to each node of the network. In other words, each node knows beforehand the time when it is to send back its own ACKNOWLEDGE bit after it has received a check code. Each node, when it has received a transmission frame normally, sends back an ACKNOWLEDGE bit to the transmission origination node via the transmission path 1 at the time position of a slot within the ACK field in the frame assigned to the originator.

FIGS. 8(a)-(c) show a concrete example of the above operation. In the example of FIGS. 8(a)-(c), a frame F is transmitted from the node N2 to N3 and N5 as destinations. The nodes N3 and N5 which have received this frame F send back ACKNOWLEDGE bits b3 and b5 at its respective position corresponding to each of the respective nodes.

Since the node 2 having a failure diagnosis apparatus knows to which node each ACKNOWLEDGE bit is assigned in the ACKNOWLEDGE bit field, the amplitude of an ACKNOWLEDGE bit having an abnormal bit position is known. In other words, by checking the amplitude of an ACKNOWLEDGE bit, the node 2 can determine a faulty node. An advantage of determining a faulty node by the monitoring of this ACKNOWL- EDGE bit is as follows. More specifically, in the transmission system of this embodiment, since it is agreed that all nodes send back an ACKNOWLEDGE bit to any frame transmitted by any node, the node 2 having the failure diagnosis apparatus can monitor a faulty node at all times without performing special operations for diagnosing a failure. However, monitoring control using this ACKNOWLEDGE bit requires that the communication LSI (COM) 24 notifies the CPU 23 of the content of the ACKNOWLEDGE bit field. Accordingly, a load of the CPU 23 of the node 2 in which the failure diagnosis function is provided is enlarged.

The above is the explanation for determining a faulty node by a method in which an ACKNOWLEDGE bit is used as a node identifier. Next, a method in which a node address (address in an originator address field) is used as the above-mentioned identifier, will be explained. As mentioned above, data in the originator address field specifies the node of a transmission origination. Therefore, if the control program of the COM 24 of the node 2 having a diagnosis function is designed to send data of a frame whose destination is not the node 2 to the CPU 23, it is possible for the CPU 23 to monitor a faulty node by using data in this originator address field in the same way as the above-mentioned monitoring by the ACKNOWLEDGE bit. However, such a way of monitoring may not be desirable sometimes because the load of the CPU 23 is enlarged. So, in this embodiment, a special mode called the failure diagnosis mode is provided, and the instructions to place the system in this mode are left to the node 2. That is, when a specific instruction is issued from the node 2, all the other nodes add their own address to a specific frame (response frame) and send it back to the node 2. FIGS. 9(a)-(e) explain this method.

FIG. 9(a) explains the diagnosis sequence in accordance with this method. That is, when the node 2 starts its diagnosis, the node 2 sends out a frame $F_1$ on the transmission path 1. This frame $F_1$ includes an instruction for instructing the failure diagnosis to start. The format of this instruction frame is shown in FIG. 9(b). That is, the content of the originator address field is "2" and the ID code is "5". This instruction allows the other nodes to know when the diagnosis mode has started by setting the data field to D.

It is agreed that the node which has received this data D sends back a response frame instantly. As shown in FIGS. 9(c)-9(e), the format of this response frame is as follows: the ID field is "7", following this is an originator address, and the data field is specified by E.

The transmission path access method at the time the response frame is sent back by the other nodes in response to the diagnosis start instruction from the node 2 is the CSMA/CD method, and the order in which respective nodes send back a response frame is not particularly defined. In the example of FIGS. 9(a)-(e), node 3 responds at first, then node 5, and lastly node 4 responds. Any predefined content of data E in the diagnosis response frame will do.

The node 2 having a transmission failure diagnosis apparatus detects the signal amplitude of a diagnosis response frame sent back from respective nodes 3 through 5 using the signal detection circuit 22, detects an occurrence of an abnormality of the transmission function of a transmission origination node on the basis of the signal amplitude value, and judges which node is abnormal on the basis of the data in the originator address field in the abnormality diagnosis response frame when an abnormality is detected.

MODIFICATION

In carrying out this invention, various modifications are possible. FIG. 10 shows one such modification. One difference of this modification from the format of the transmission frame shown in FIG. 7 is that it has no originator address field.

The operation for a case where a failure diagnosis is performed using this frame will be described below. When a diagnosis is started, the node 2 having a failure diagnosis apparatus transmits a frame signal as shown in FIG. 11(b). That is, it sends a data F to nodes 3, 4 and 5. It is agreed beforehand that a node which has received this data F sends back a diagnosis response frame. That is, the nodes 3, 4 and 5 send a response, respectively as shown in FIGS. 11(c), 11(d) and 11(e). At this time, the content of the data sent back by the respective nodes is an originator address. The order in which respective nodes respond is not particularly defined.

The node 2 having a failure diagnosis apparatus detects the signal amplitude sent back from respective nodes using the signal amplitude detection circuit 22 and judges which node is abnormal from the content (originator address) of the data field in an abnormal frame when an abnormality occurs. For example, when the signal amplitude of the frame of the data field (="5") is small, it is known that an abnormality has occurred in the bus interface of the node 5 or in a bus branch line reaching the node 5.

The application field of the present invention is not limited to automobiles. The present invention is also not limited to the above embodiments and therefore various changes and modifications can be made within the spirit and scope of the present invention. To apprise the public of the scope of the present invention, the following claims are made.

What is claimed is:

1. A failure diagnosis apparatus for use in a transmission system which sends and receives data among a plurality of nodes connected by a common transmission path made up of a pair of signal lines, the apparatus comprising:

(a) reception means connected to signal lines of said transmission path for receiving first and second differential transmission signals on the signal lines of the transmission path, each of said first and second differential transmission signals containing an identifier for identifying the node of a transmission origination;

(b) amplitude detection means for detecting the signal amplitudes of the differential transmission signals received by the reception means; and (c) judgment means, operatively connected to said amplitude detection means, for judging a bit-failure in the system on the basis of the amplitudes of the differential transmission signals detected by the amplitude detection means, and wherein said reception means includes a first reception circuit for receiving said first and second differential transmission signals separately from each other and outputting the received signals to said amplitude detection means and a second reception circuit for receiving said first and second differential signals in a differential input format and outputting received signal data to said judgment means, said judgment means including means for determining a faulty node on the basis of said identifier in the received differential transmission signals from the reception means and the amplitude of the received transmission signals from said amplitude detection means.

2. A failure diagnosis apparatus according to claim 1, wherein said first and second differential transmission signals have an inverse phase to each other.

3. A failure diagnosis apparatus according to claim 1, wherein said judgment means includes means for comparing the amplitude of a transmission signal detected by the amplitude detection means with that of the transmission signal during an error free time.

4. A failure diagnosis apparatus according to claim 1, wherein in one frame of a transmission signal sent and received among nodes in the transmission system there is defined an ACKNOWLEDGE bit field with the number of bits corresponding to the number of all nodes, and each bit position in the bit field is assigned to the respective node, wherein it is agreed that each node sends out an ACKNOWLEDGE bit at the respective bit position which is assigned to itself if the transmission signal which it has received is normal, and wherein this diagnosis apparatus is included in one specific node in the transmission system and said judgment means of this diagnosis apparatus determines a faulty node on the basis of the amplitude of a transmission signal corresponding to each ACKNOWLEDGE bit in the ACKNOWLEDGE bit field.

5. A failure diagnosis apparatus according to claim 1, wherein this diagnosis apparatus is contained in one specific node in this multiplex transmission system.

6. A failure diagnosis apparatus for use in a transmission system which sends and receives data among a plurality of nodes connected by a common transmission path made up of a pair of signal lines, the apparatus comprising:
  (a) reception means, connected to said transmission path for receiving first and second differential transmission signals on the pair of signal lines, each of the transmission signals containing an identifier for identifying the node of a transmission origination;
  (b) amplitude detection means for detecting the signal amplitudes of the differential transmission signals received by the reception means; and
  (c) judgment means, operatively connected to said amplitude detection means and said reception means, for judging a failure in the system, wherein said reception means includes a circuit for receiving said first and second differential signals separately from each other and outputting the received differential signals to said amplitude detection means, said amplitude detection means includes a circuit for sampling the peak value of an output signal from the receiving circuit and converting this peak value to a digital value and outputting said digital value to said judgment means.

7. A failure diagnosis apparatus according to claim 6, wherein the diagnosis apparatus is contained in one specific node in the transmission system.

8. A failure diagnosis apparatus for use in a transmission system which sends and receives data among a plurality of nodes connected by a common transmission path, comprising:
  (a) reception means connected to said transmission path for receiving a transmission signal on the transmission path, the transmission signal containing an identifier for identifying the node of a transmission origination;
  (b) amplitude detection means for detecting the signal amplitude of the transmission signal received by the reception means; and
  (c) judgment means, operatively connected to said amplitude detection means and said reception means, for judging a failure in the system by determining a faulty node on the basis of said identifier in the received transmission signal from the reception means and the amplitude of the received transmission signal from said amplitude detection means.

9. A failure diagnosis apparatus according to claim 8, wherein said common transmission path is made up of a pair of signal lines and said transmission signal is represented by first and second differential signals on said pair of signal lines.

10. A failure diagnosis apparatus according to claim 9, wherein said reception means includes a first reception circuit for receiving said first and second differential signals separately from each other and outputting the received signals to said amplitude detection means and a second reception circuit for receiving said first and second differential signals in a differential input format and outputting received signal data to said judgment means, said judgment means including means for determining a faulty node on the basis of said identifier in the received transmission signals from the reception means and the amplitude of the received transmission signals from said amplitude detection means.

11. A failure diagnosis apparatus according to claim 10, wherein in one frame of a transmission signal sent and received among nodes in the transmission system there is defined an ACKNOWLEDGE bit field with the number of bits corresponding to the number of all nodes, and each bit position in the bit field is assigned to the respective node, wherein it is agreed that each node sends out an ACKNOWLEDGE bit at the respective bit position which is assigned to itself if the transmission signal which it has received is normal, and wherein this diagnosis apparatus is included in one specific node in the transmission and said judgment means of this diagnosis apparatus is included in one specific node in the transmission system and said judgment means of this diagnosis apparatus determines a faulty node on the basis of the amplitude of a transmission signal corresponding to each ACKNOWLEDGE bit in the ACKNOWLEDGE bit field.

12. A failure diagnosis apparatus according to claim 11, wherein the diagnosis apparatus is contained in one specific node in the transmission system.

* * * * *

UNITED STATES PATENT AND TRADEMARK OFFICE
CERTIFICATE OF CORRECTION

PATENT NO. :  5,142,526
DATED      :  August 25, 1992
INVENTOR(S):  HIROO MORIUE, ET AL.

It is certified that error appears in the above-identified patent and that said Letters Patent is hereby corrected as shown below:

Col. 4, line 35, after "Fig. 1" insert --,--.

Col. 6, line 18, change "transisotr" to --transistor--;

Col. 6, line 21, change "8" to --3--.

Col. 8, line 11, change "b" to --"--.

Signed and Sealed this

Ninth Day of November, 1993

Attest:

BRUCE LEHMAN

Attesting Officer     Commissioner of Patents and Trademarks